| (12) | United States Patent<br>Brown | (10) Patent No.: US 10,592,991 B2<br>(45) Date of Patent: *Mar. 17, 2020 |
|---|---|---|

(54) SYSTEM AND METHOD FOR DETECTING POTENTIAL PROPERTY INSURANCE FRAUD

(71) Applicant: Hartford Fire Insurance Company, Hartford, CT (US)

(72) Inventor: Patrick D. Brown, Marlborough, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/907,841

(22) Filed: Feb. 28, 2018

(65) Prior Publication Data

US 2018/0189891 A1 Jul. 5, 2018

Related U.S. Application Data

(63) Continuation of application No. 14/589,327, filed on Jan. 5, 2015, now Pat. No. 9,940,677, which is a continuation of application No. 13/547,597, filed on Jul. 12, 2012, now Pat. No. 8,929,586, which is a continuation-in-part of application No. 13/301,281, filed on Nov. 21, 2011, now Pat. No. 8,306,258, (Continued)

(51) Int. Cl.
| *G06Q 40/00* | (2012.01) |
| *G06Q 40/08* | (2012.01) |
| *G06F 16/51* | (2019.01) |
| *G06K 9/00* | (2006.01) |
| *G06K 9/52* | (2006.01) |
| *G06T 11/20* | (2006.01) |
| *G06K 9/46* | (2006.01) |

(52) U.S. Cl.
CPC .............. *G06Q 40/08* (2013.01); *G06F 16/51* (2019.01); *G06K 9/0063* (2013.01); *G06K 9/52* (2013.01); *G06T 11/206* (2013.01); *G06K 2009/00644* (2013.01); *G06K 2009/4657* (2013.01)

(58) Field of Classification Search
CPC ......... G06Q 40/08; G06K 2009/00644; G06K 2009/4657; G06K 9/0063; G06K 9/52; G06F 17/3028
See application file for complete search history.

(56) References Cited

U.S. PATENT DOCUMENTS 5,898,779 A * 4/1999 Squilla ............... H04N 1/32128
380/200
7,504,958 B1 * 3/2009 Genovese ............ G01N 1/2202
340/632
(Continued)

*Primary Examiner* — Jingge Wu
(74) *Attorney, Agent, or Firm* — McCormick, Paulding & Huber PLLC

(57) ABSTRACT

Methods for assessing a condition of property for insurance purposes include determining a concentration of a molecular constituent at the insured property. The molecular constituent may be a byproduct or residual product of anthropogenic fire accelerants or anthropogenic sources of ignition or explosion. In some embodiments, the concentration of the molecular constituent at the insured property is determined using spectral imaging technology. Radiative transfer computer models may be used to determine the concentration of the molecular constituent based on spectral images.

20 Claims, 11 Drawing Sheets

Related U.S. Application Data which is a continuation of application No. 12/117,867, filed on May 9, 2008, now Pat. No. 8,081,795.

(56) References Cited

U.S. PATENT DOCUMENTS

| | | | | |
|---|---|---|---|---|
| 8,019,629 B1* | 9/2011 | Medina, III | ............ | G06Q 40/08 705/4 |
| 8,078,436 B2* | 12/2011 | Pershing | ................ | G06Q 30/02 703/2 |
| 8,229,768 B1* | 7/2012 | Hopkins, III | .......... | G06Q 40/08 705/4 |
| 8,229,769 B1* | 7/2012 | Hopkins, III | ...... | G06Q 10/0635 705/4 |
| 8,346,578 B1* | 1/2013 | Hopkins, III | .......... | G06Q 40/00 382/100 |
| 2003/0004965 A1* | 1/2003 | Farmer | ................ | G06Q 10/087 |
| 2004/0126038 A1* | 7/2004 | Aublant | ............ | H04N 1/00137 382/305 |
| 2005/0105789 A1* | 5/2005 | Isaacs | .................... | G01N 21/94 382/141 |
| 2005/0180631 A1* | 8/2005 | Zhang | ...................... | G06T 5/50 382/173 |
| 2007/0233441 A1* | 10/2007 | Crowley, Jr. | ............ | G16B 5/00 703/11 |
| 2009/0015585 A1* | 1/2009 | Klusza | ................... | G06F 16/51 345/420 |
| 2009/0147988 A1* | 6/2009 | Jones | .................... | G06K 9/036 382/100 |
| 2009/0208108 A1* | 8/2009 | Shimano | .............. | G06K 9/4661 382/190 |
| 2009/0310828 A1* | 12/2009 | Kakadiaris | ......... | G06K 9/00208 382/118 |
| 2010/0106395 A1* | 4/2010 | Gadler | ................... | G01C 21/26 701/117 |
| 2010/0290697 A1* | 11/2010 | Benitez | ................... | G06T 15/20 382/154 |
| 2011/0161117 A1* | 6/2011 | Busque | ................. | G06Q 40/08 705/4 |

* cited by examiner

SYSTEM AND METHOD FOR DETECTING POTENTIAL PROPERTY INSURANCE FRAUD

CROSS REFERENCE TO RELATED APPLICATION

This application is a continuation of prior application Ser. No. 14/589,327, filed Jan. 5, 2015 and published as U.S. Patent Application No. 2015/0193884, which is a continuation of prior application Ser. No. 13/547,597, filed Jul. 12, 2012 and issued as U.S. Pat. No. 8,929,586, which is a continuation-in-part of prior application Ser. No. 13/301,281, filed on Nov. 21, 2011 and issued as U.S. Pat. No. 8,306,258, which is a continuation of prior application Ser. No. 12/117,867, filed on May 9, 2008 and issued as U.S. Pat. No. 8,081,795, the entire contents of which are incorporated herein by reference.

TECHNICAL FIELD

The present invention relates to a system and method for assessing property conditions and, more particularly, to use remote sensing for assessing property conditions and potential insurance fraud.

BACKGROUND

Within the insurance industry, a typical process for generating a claim involves first receiving notice from an insured that a loss has occurred. Next, an insurance representative conducts a personal visit to the premises to assess the damage. Additionally, if there is evidence that the damage was caused intentionally, an insurance fraud investigation may be conducted. Upon completion of the on-site visit, the insurance representative submits to the home office an assessment regarding the monetary amount of the damage and/or potential insurance fraud. Upon receipt of the assessment, the insurance company begins the claim process.

One drawback to the existing process is that insurance personnel may be unable to physically access the insured property. After a major catastrophe, such as a hurricane, flood, wild fire, or tornado, large areas of a community may be cordoned off to all except emergency personnel. Further, even if an insurance representative was able to reach the property, there may be no electrical or phone service to relay the results of the assessment. In some instances, local conditions may create a life-threatening situation for personnel attempting to assess the condition of the property.

From a logistics perspective, further drawbacks exist. After a large-scale disaster, insurance companies may be required to deploy scores of representatives to remote locations with little or no advance planning. Such large-scale deployment places a heavy financial burden on the insurance company and strains personnel resources.

Another drawback to the current process is that the insured may be forced to wait for long periods of time, perhaps months, to receive their claim payment from the insurance company. Such a situation is untenable for many people who have lost their primary residence, and creates great hardship.

In some insurance applications, sensors fixedly attached to an insured property detect abnormal conditions such as the level of gaseous substances, level of water, or the presence of biological agents. Such in-situ sensors may have some usefulness in the early detection of hazardous conditions or minor perturbations in the status quo, but are useless if a catastrophic event such as fire disables or destroys the sensor.

Therefore, there is a need for assessing property conditions that does not require on-site personnel or in-situ sensors.

SUMMARY

According to the present application, methods for assessing a condition of property for insurance purposes include determining a concentration of a molecular constituent at the insured property. The molecular constituent may be a byproduct or residual product of anthropogenic fire accelerants or anthropogenic sources of ignition or explosion. In some embodiments, the concentration of the molecular constituent at the insured property is determined using spectral imaging technology. Radiative transfer computer models may be used to determine the concentration of the molecular constituent based on spectral images.

In one embodiment, a method for assessing a condition of an insured property for insurance purposes comprises a computer processor determining a first spectral signature indicative of a first concentration of a molecular constituent at the insured property at a first timestamp and a second spectral signature indicative of a second concentration of the molecular constituent at the insured property at a second timestamp later than the first timestamp. Further, the computer processor determines a spectral difference between the first spectral signature and the second spectral signature, which corresponds to a difference between the first and second concentrations of the molecular constituent, and the computer processor determines whether the spectral difference exceeds a first predetermined threshold value, which is indicative of a change in the condition of the insured property.

In another embodiment, a method for assessing a condition of a property for insurance purposes comprises a computer processor determining a spectral signature indicative of a concentration of a molecular constituent at the insured property, and determining whether the concentration of the molecular constituent exceeds a first predetermined threshold value, which is indicative of a condition of the insured property.

DETAILED DESCRIPTION

Figure 1:
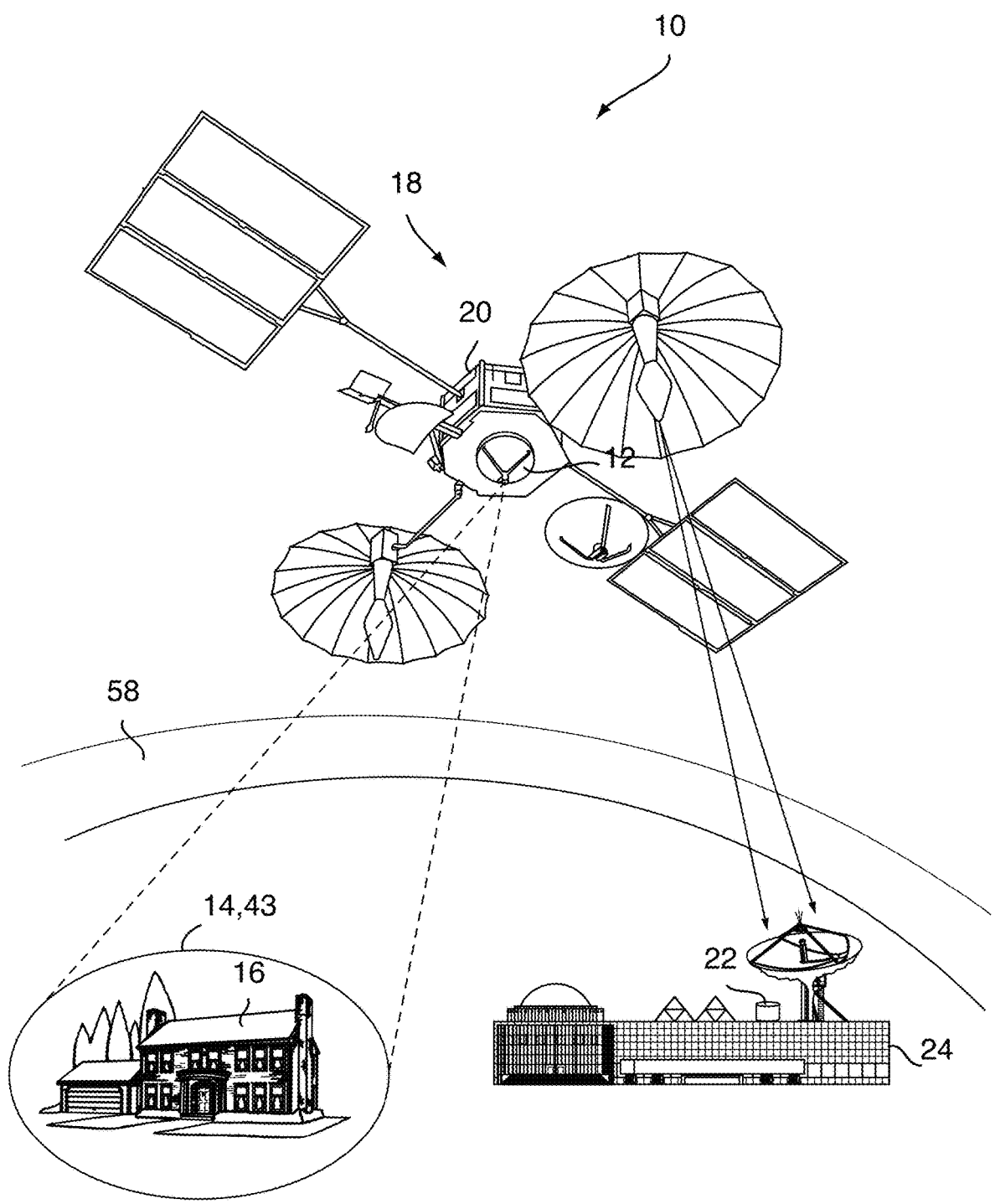
FIG. 1 is a schematic diagram of a system for collecting a spectral image to assess a condition of property in accordance with an embodiment of the present invention.

Referring to FIG. 1, a system 10 for assessing a condition of a target property 16 includes a sensor 12 configured to obtain a first spectral image 14 of irradiative effects on the target property 16. The sensor 12 is located remotely from the target property 16 so as minimize the sensor's vulnerability to local conditions. In the embodiment shown, the sensor 12 includes an imaging spectrometer operating in the infrared, visible and ultraviolet bands of the electromagnetic spectrum. It will be appreciated that the sensor 12 may operate in additional spectral ranges within the electromagnetic spectrum. Additionally, the sensor 12 may be further configured for measuring the surface albedo of the target property 16. For example, sensor 12 may include an albedometer, such as Albedometer CMP 11 made by Kipp & Zonen of the Netherlands. Accordingly, the sensor 12 may be configured to obtain a surface albedo measurement 60 of the target property 16. Although the albedometer is described as being included in the sensor 12, it should be appreciated that the albedometer may be provided as a separate sensor. The sensor 12 is advantageously housed in a carrier vehicle 18 to protect the delicate nature of its instrumentation. In the embodiment shown, the carrier vehicle 18 is a satellite in low-earth orbit. An example satellite/sensor system operative with the present invention is the Tropospheric Emission Spectrometer (TES) sensor aboard the Earth Observing System AURA satellite, launched Jul. 15, 2004.

In the disclosed embodiment, the sensor 12 acquires the first spectral image 14 and transmits it to an image processor 20 for storage on a data storage medium 22. Additionally, the sensor 12 may obtain the surface albedo measurement 60 of the target property 16 and transmit it for storage on the data storage medium 22. The location of the data storage medium 22 is not critical to the disclosed invention. For example, the data storage medium 22 may be located on the carrier vehicle 18, or at a remote signal processing facility 24 located on the ground, as shown in FIG. 1.

The quality of the first spectral image 14 is dependent on upon the technology employed in the sensor 12, but generally depends upon the spectral, radiometric, and spatial resolutions. Spectral resolution refers to the number of frequency bands recorded, including frequency bands within the microwave, infrared, visible and ultraviolet spectrums. In the disclosed embodiment, the sensor 12 operates in the infrared, visible and ultraviolet bands of the electromagnetic spectrum, but those skilled in the art will appreciate other exemplary sensors 12 operate in up to 31 bands within a spectrum.

Radiometric resolution refers to the number of different intensities of radiation the sensor is able to distinguish. Typically, intensities range from 8 bits (256 levels of gray scale) to 14 bits (16,384 shades of color) depending on the particular need and storage capability of the data storage medium 22. In the disclosed embodiment, a range of 14 bits in each band is preferred.

Spatial resolution refers to the size of a pixel recorded in an image. Current technology allows spatial resolutions as fine as a 1-meter side length. For most applications in the present invention, a 3-meter side length is sufficient resolution. However, in some specialized applications discussed below, a 1-meter side length is preferred.

Figure 2:
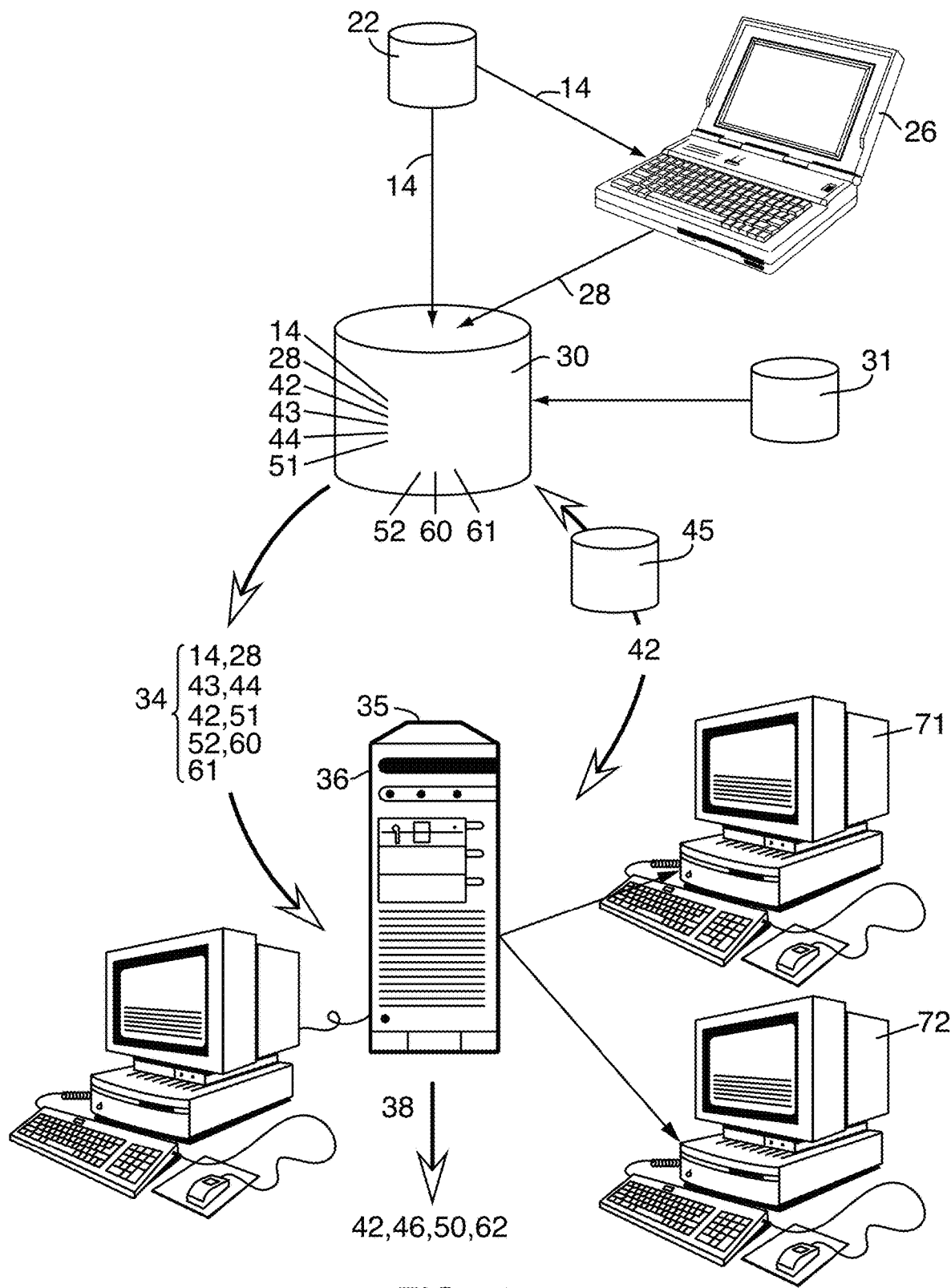
FIG. 2 is a schematic diagram of a post-processing system for the spectral image of FIG. 1.

Referring to FIG. 2, the first spectral image 14 stored on the data storage medium 22 is post-processed by a post-processor 26 and converted to a first spectral radiance plot 28. In the conversion process, information is added to the file such as time, date, the location of the target property 16, and the location of the carrier vehicle 18. Often, radiometric and frequency calibrations are made to correct for the geolocation discrepancies. In another example system 10, the post-processor 26 is the image processor 20, meaning the image processor 20 additionally performs the conversion function. The first spectral radiance plot 28 is stored in a data storage device 30 as an input 34 for a radiative transfer computer model 36.

The radiative transfer computer model 36 is in communication with a server 35, and preferably executed on the server. As shown in FIG. 2, the server 35 uses the first spectral image 14 or the spectral radiance plot 28 as input 34 to the model 36. In one example system 10, the server 35 converts the first spectral image 14 to the first spectral radiance plot, thereby eliminating the need for the post-processor 26. The model 36 generates an output 38 corresponding to a condition of the target property 16, thereby establishing a first spectral signature 42 of the target property 16. The first spectral signature 42 may be stored in a historical database 45, which in some examples is the same database as the data storage device 30.

Figure 3:
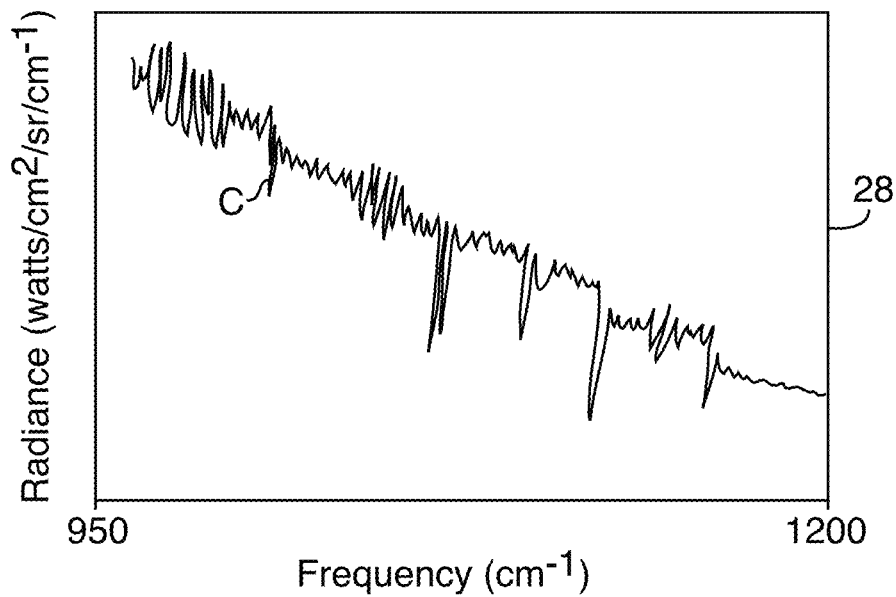
FIG. 3 is a graphic representation of a spectral radiance plot generated by the post-processing system of FIG. 2.

Referring to FIG. 3, the first spectral radiance plot 28 is shown in greater detail. In the example shown, the radiance of molecular constituents is shown as a function of wavenumber at a single altitude. In particular, the radiance of carbon is depicted, notated by its element symbol (C). The first spectral radiance plot 28 serves as the input 34 to the radiative transfer computer model 36, which in one example generates the output 38 corresponding to the concentration of carbon in the atmosphere at the given altitude.

Referring back to FIG. 2, the first spectral radiance plot 28 stored in the data storage device 30 may be generated from the first spectral image 14 acquired by the remote sensor 12. In another embodiment of the present invention, the first spectral radiance plot 28 is stored in a public database 31 and transferred to the data storage device 30. Similar spectral radiance plots 28 may be accessed from public databases such as the high-resolution transmission molecular absorption database (HITRAN), or the Gestion et Etude des Informations Spectroscopiques Atmosphériques spectroscopic data base (GEISA). In the disclosed example, the first spectral radiance plot 28 from the public database 31 serves as the input 34 to the radiative transfer computer model 36.

The radiative transfer computer model 36 solves the inverse problem common to remote sensing applications. An inverse problem refers to the dilemma encountered in attempting to determine a condition for which no direct measurements can be made. The problem takes the form:

$$data = function(parameter)$$

where data is a plurality of discrete measurements, the parameter is the condition to be determined, and the function is a mathematical relationship between the data and the parameter. Initially, neither the function nor the parameter is known. Since the parameter is ultimately what needs to be determined, the problem takes the form:

parameter=function$^{-1}$(data)

or, as applied to the disclosed embodiment of the present invention:

spectral signature=function$^{-1}$(spectral radiance plot)

The inverse function can be linear or, as in most cases, non-linear. Determination of the inverse function is difficult because the data is non-continuous and inherently contains some degree of noise. The sensitivity of the noise in relation to the parameter being determined is unknown initially, and must be approximated.

The radiative transfer computer model 36 typically includes two components: a series of forward models and one inverse model. The forward models iteratively predict the inverse function based upon the plurality of discrete measurements. Using a nonlinear least squares approach, each forward model tests the discrete measurements (i.e. observed data) against the parameters predicted by the inverse function, then successively refines the inverse function to achieve a better approximation. When the forward model ultimately converges with the observed data, the resulting inverse function is used in the radiative transfer computer model 36 to output the first spectral signature 42.

Radiative transfer computer models 36 exist in the public domain to assist in establishing the first spectral signature 42. One model currently available to the public is the line-by-line radiative transfer model (LBLRTM) developed by Atmospheric and Environmental Research, Inc. (www.aer.com). Other radiative transfer models currently available to the public include the GENLN2, LINEPAK, and FIRE-ARMS. Alternatively, the radiative transfer computer model 36 may be custom built to suit the particular needs of the end user.

Figure 4:
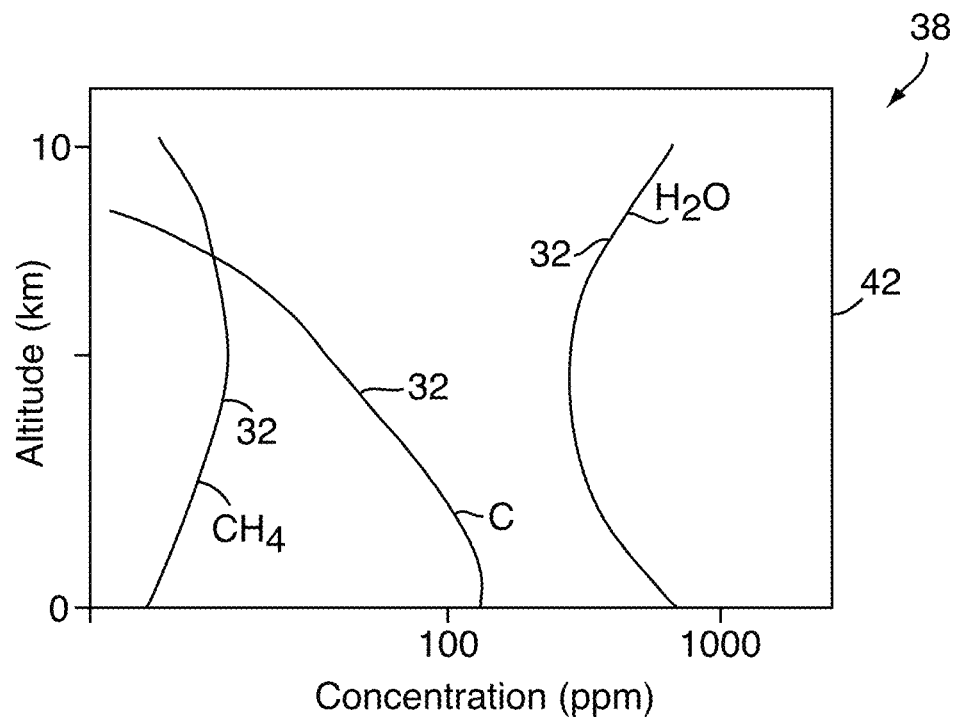
FIG. 4 is a graphic representation of a spectral signature at a single altitude generated by the post-processing system of FIG. 2.

Referring to FIG. 4, the output 38 of the radiative transfer computer model 36 generates the first spectral signature 42 of the target property 16 at a first timestamp 32. In the disclosed example, the first spectral signature 42 comprises a concentration of a specific molecule or constituent, such as, for example, methane ($CH_4$), carbon (C), water vapor ($H_2O$), carbon monoxide (CO), or nitrous oxide ($N_2O$). The spectral signature 42 may further comprise a vertical concentration profile, which characterizes the concentration of a molecule or constituent at various altitudes ranging from zero (surface) to approximately 10,000 meters. As will be discussed below, other spectral signatures 42 are possible.

In some instances, an insurance company may wish to utilize the first spectral signature 42 for a particular molecule or constituent to determine if an abnormal condition exists on the target property 16 or if an abnormal condition on the target property 16 may be the result of potential fraud. Various spectral signatures corresponding to various molecules or constituents (e.g., first spectral signature 42) may serve as baseline reference values for future comparisons. Thus, various spectral signatures corresponding to various molecules or constituents (e.g., first spectral signature 42) may be stored on the historical database 45 for future reference.

Figure 5:
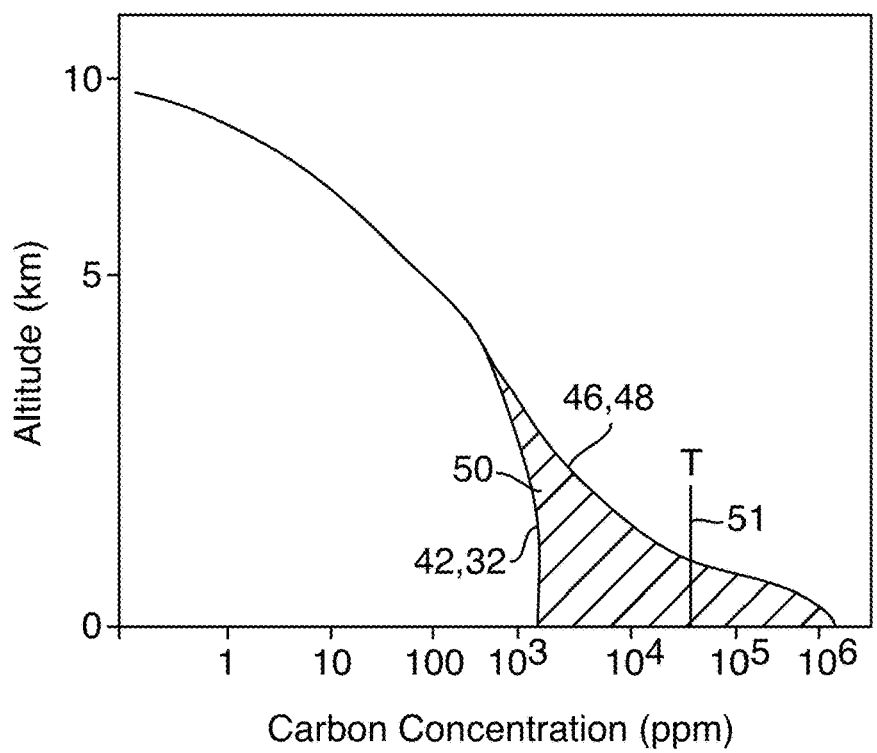
FIG. 5 is a graphic representation of two spectral signatures at a plurality of altitudes generated by the post-processing system shown in FIG. 2.

Referring to FIG. 5, an insurance company may assess the condition of the target property 16 at some other, later time. A second spectral signature 46 is acquired at a second timestamp 48 later than the first timestamp 32 using the aforementioned remote sensing method. The insurance company may define a threshold value 51 above which an abnormal condition is deemed to exist on the target property 16 or above which potential fraud is suspected. The threshold value 51 may be an absolute number, such as a level or concentration of a molecular constituent. Alternatively, for example, the threshold value 51 may be a relative value, such as a percentage increase in a molecular constituent over a baseline value (e.g., first spectral signature 42).

Still referring to FIG. 5, the first spectral signature 42 at the first timestamp 32 is exemplified as the concentration of carbon as a function of altitude. The second spectral signature 46 at the second timestamp 48 is similarly shown. Comparison between the first spectral signature 42 and the second spectral signature 46 establishes a spectral difference 50, shown in the shaded area of the graph. If the spectral difference 50 exceeds the threshold value 51, an insurance-related action is triggered. The particular threshold value 51 varies based upon molecular constituency, for example, as well as the requirements of the insurance company. However, the threshold values 51 may be determined and stored in the data storage device 30, as shown in FIG. 2. In the example shown in FIG. 5, the threshold value 51, denoted as (T), is shown as an absolute value of 50,000 parts per million (ppm). As can be seen, the second spectral signature 46 exceeds the threshold value 51 in the lower atmosphere. Thus, an abnormal condition is deemed to exist at the target property 16, and the insurance company will initiate an insurance-related action.

Referring back to FIG. 2, server 35 may communicate with remote computer systems 71, 72 in the insurance company's network. For example, server 35 may be connected to a work queue computer 71 or payment system computer so that messages can be transmitted from the server to initiate an insurance-related action. For example, server 35 may send a message indicating an abnormal condition at a target property 16 to a work queue in a remote computer 71 for an investigator to perform a fraud investigation or for an agent to perform a field inspection. Also, server 35 may send a message to the insurance company's payment computer system 72 for a stop payment or recovery of payment based on a determination of fraud or potential fraud.

In the disclosed example of FIG. 5, a high level of carbon, where previously the concentration was relatively small, indicates a change to the condition at the target property 16, namely burning. In other instances, the presence of high levels of particular molecular constituents may indicate potential fraud. Certain molecular constituents are known byproducts and/or residual products of fire accelerants and/or explosives. For example, the use of fire accelerants may create oxygen-starved fires, which create high levels of carbon and carbon monoxide. Also, when gasoline is used as a fire accelerant, high levels of octanes may be found. Table 1 below shows exemplary molecular constituents that are known byproducts or residual products of fire accelerants and explosives. Table 1 indicates the type of molecular constituent, the corresponding absorption peak (at various wavelengths) and the associated anthropogenic source.

TABLE 1

| TYPE | ABSORPTION PEAK $cm^{-1}$ (nm) | ASSOCIATED SOURCE |
|---|---|---|
| Alcohols | 1040-1060 $cm^{-1}$ (9434-9615 nm) ~1100 $cm^{-1}$ (~9091 nm) | Fire Accelerants |

TABLE 1-continued

| TYPE | ABSORPTION PEAK cm$^{-1}$ (nm) | ASSOCIATED SOURCE |
|---|---|---|
| Phenols | 1150-1200 cm$^{-1}$ (8333-8696 nm) 1200 cm$^{-1}$ (8333 nm) | Plastic Explosives |
| Nitro compounds | 1540 cm$^{-1}$ (6494 nm) 1380 cm$^{-1}$ (7246 nm) 1520, 1350 cm$^{-1}$ (7407-6579 nm) NOH oxime | Nitrogen-based (fertilizer) Explosives, TNT Explosives |
| O—H (stretch) C=N N—O | 3550-3600 cm$^{-1}$ 1650-1680 cm$^{-1}$ 930-960 cm$^{-1}$ N—O amine oxide | Nitrogen-based (fertilizer) Explosives, TNT Explosives |
| Aliphatic Aromatic | 940-980 cm$^{-1}$ 1200-1300 cm$^{-1}$ N=O | Nitrogen-based (fertilizer) Explosives, TNT Explosives |
| Nitroso Nitro | 1500-1600 cm$^{-1}$ 1510-1550 cm$^{-1}$, 1320-1380 cm$^{-1}$ | Nitrogen-based (fertilizer) Explosives, TNT Explosives |
| N$_2$-based | 58800-71500 cm$^{-1}$ | Nitrogen-based (fertilizer) Explosives, TNT Explosives, Plastic Explosives |

Figure 7A:
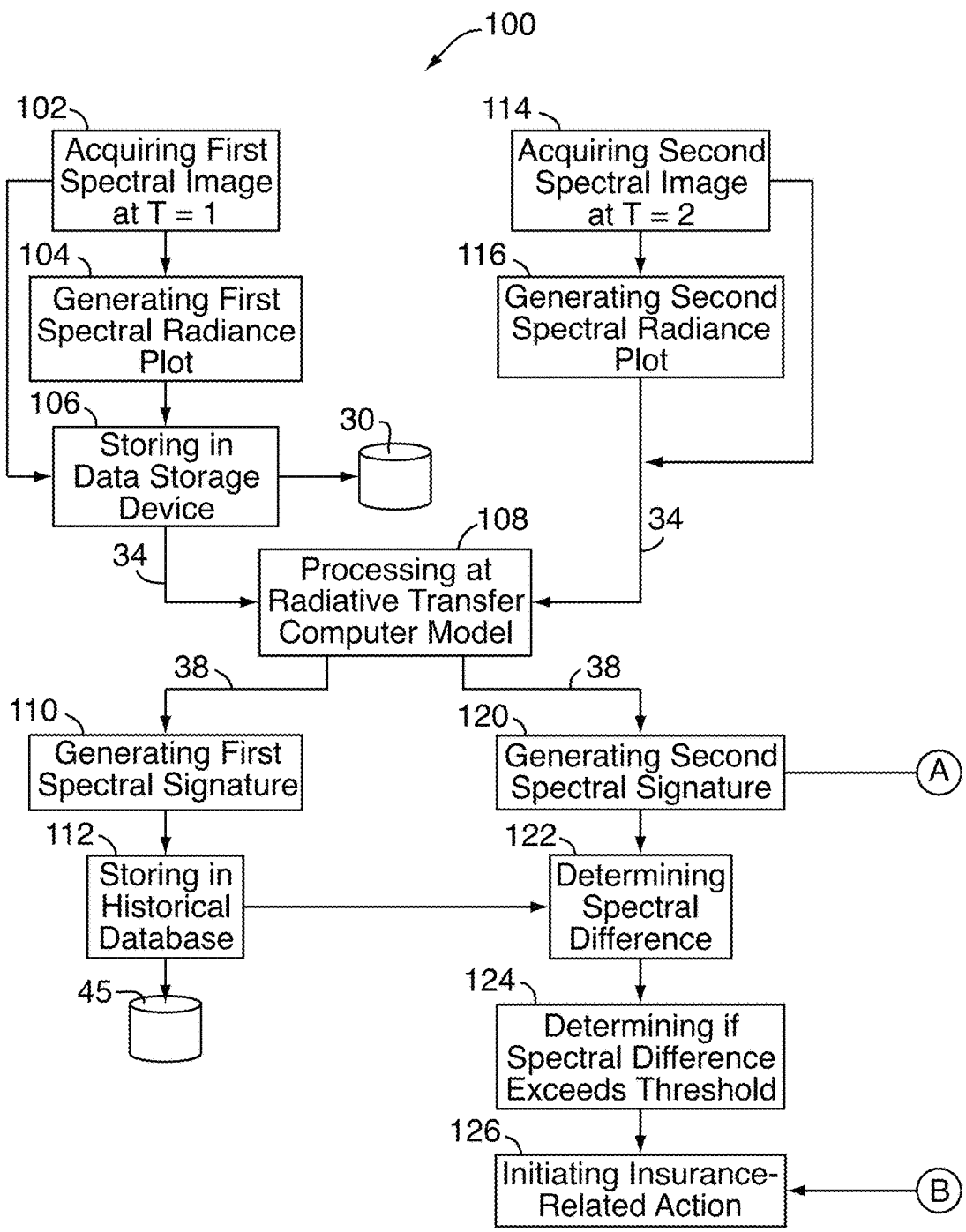
FIGS. 7a-7b show a block diagram of a method for assessing a condition of property in accordance with the present invention.
Figure 7B:
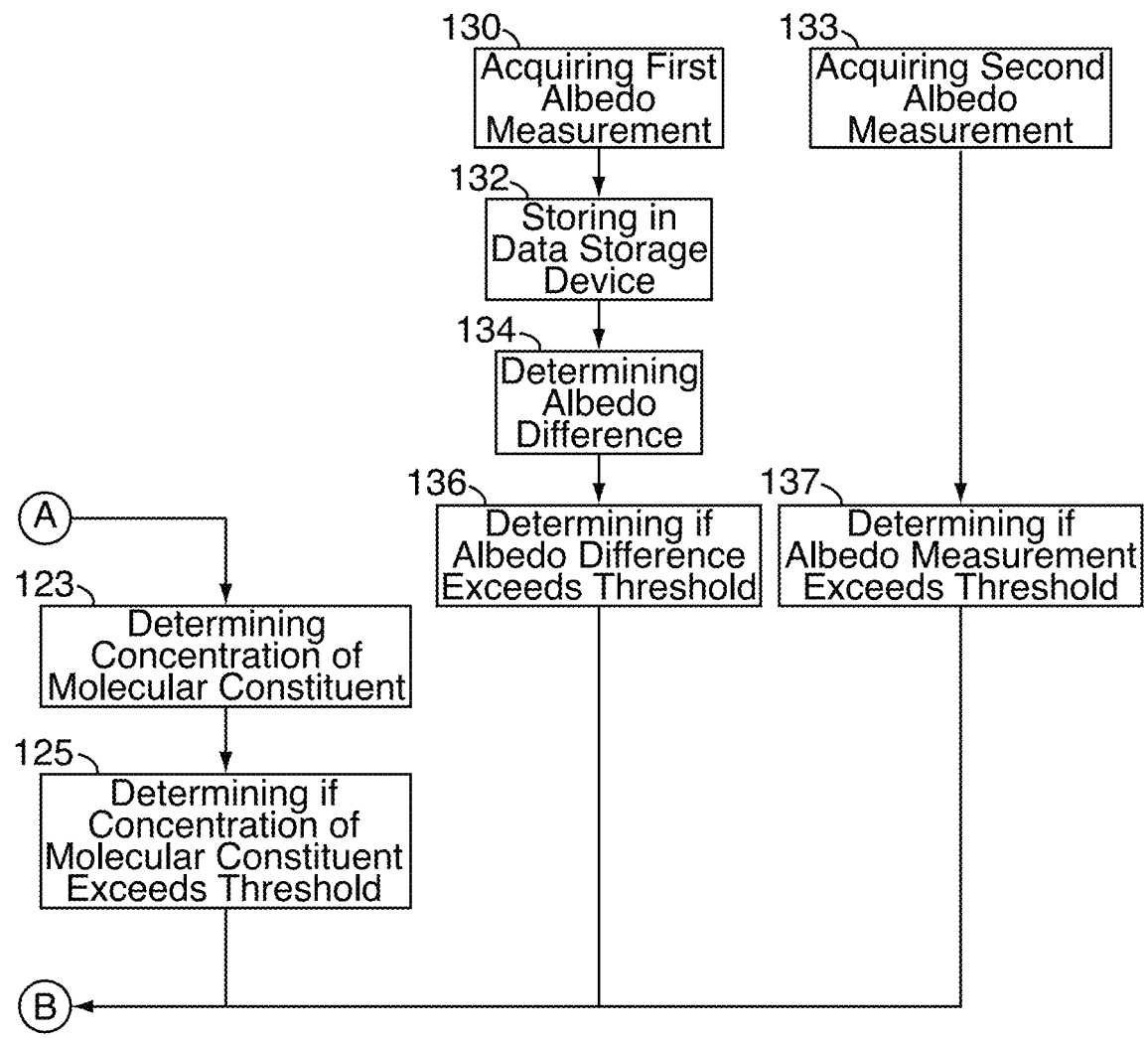

Referring to FIGS. 7a-7b, a method 100 for assessing a condition of property for insurance purposes comprises a step 102 of acquiring the first spectral image 14 at a first timestamp from the remote sensor 12 operating in at least the infrared, visible and ultraviolet bands of the electromagnetic spectrum. The first spectral image 14 may be converted to the first spectral radiance plot 28 at a step 104. The first spectral image 14 and/or the first spectral radiance plot 28 are stored on the data storage device 30 at a step 106 to be used as the input 34 for the radiative transfer computer model 36. At a step 108, the radiative transfer computer model 36 processes the input 34 and at a step 110 generates the first spectral signature 42 as the output 38. The first spectral signature 42 corresponds to a condition of the target property 16, such as the amount of carbon at ground level. At a step 112, the first spectral signature 42 may be stored in the historical database 45 as a baseline for future reference.

The condition of the target property 16 may be assessed at the second timestamp 48 later than the first timestamp 32. In a step 114, a second spectral image 43 is acquired in the same manner as the first spectral image 14, as shown in FIG. 1. The second spectral image 43 may be converted to a second spectral radiance plot 44 at a step 116. The second spectral image 43 and/or the second spectral radiance plot 44 are used as input 34 for the radiative transfer computer model 36 which, in the step 108, processes the input 34 to generate the second spectral signature 46 as the output 38 in a step 120, as also shown in FIG. 2.

The spectral difference 50 is determined at a step 122 by accessing the first spectral signature 42 stored in the historical database 45 and comparing it to the second spectral signature 46 generated at the step 120. The spectral difference 50 represents a change in the concentration of a molecular constituent associated with a change to the condition of the target property 16, which may have been potentially caused with intent to defraud the insurance company. In some cases, the change in concentration of the molecular constituent may exceed the threshold value 51 for the spectral signature of the molecular constituent being compared. For example, in a step 124, the spectral difference 50 is compared to the threshold value 51. If the spectral difference 50 exceeds the threshold value 51, the computer server 35 an insurance-related action at a step 126.

In one example, the insurance-related action may be initiating a claim because the spectral difference indicates the target property 16 has been lost to a fire. In another example, the insurance related action may be transmitting a message indicating potential fraud or initiating a fraud investigation, because the spectral difference indicates a high level of a molecular constituent associated with fraudulent activity. For example, the spectral difference may indicate a high level of a molecular constituent that is a byproduct or residual product of anthropogenic fire accelerants or anthropogenic sources of ignition or explosion. Accordingly, server 35 may send a message indicating an abnormal condition at a target property 16 to a work queue in a remote computer 71 for an investigator to perform a fraud investigation or for an agent to perform a field inspection. Also, server 35 may send a message to the insurance company's payment computer system 72 for a stop payment or recovery of payment based on a determination of fraud or potential fraud.

In an alternative embodiment, steps 123 and 125 may be performed instead of steps 122 and 124. In a step 123, a concentration of a molecular constituent is determined from the second spectral signature 46. The concentration of the molecular constituent may be associated with a condition of the target property 16, which may have been potentially caused with intent to defraud the insurance company. If the concentration of the molecular constituent from the spectral signature 46 exceeds the threshold value 51, the computer server 35 an insurance-related action at a step 126.

In one example, the insurance-related action may be initiating a claim because the concentration of the molecular constituent indicates a change in condition to the target property 16 (e.g., fire damage, flooding). In another example, the insurance related action may be transmitting a message indicating potential fraud or initiating a fraud investigation, because the concentration of the molecular constituent indicates abnormal levels associated with fraudulent activity. More particularly, server 35 may send a message indicating an abnormal condition at a target property 16 to a work queue in a remote computer 71 for an investigator to perform a fraud investigation or for an agent to perform a field inspection. Also, server 35 may send a message to the insurance company's payment computer system 72 for a stop payment or recovery of payment based on a determination of fraud or potential fraud.

The threshold value 51 may be a baseline value based on the concentration of a molecular constituent under various normal conditions. The threshold value may be set such that a spectral difference 50 or a concentration of a molecular constituent exceeding the threshold value provides a strong indication of an abnormal condition at the target property 16. For example, the threshold value for a molecular constituent may be set some percentage above normal concentrations of the molecular constituent. The threshold value 51 may be established with respect to a molecular constituent that is a byproduct or residual product of burning, flooding, anthropogenic fire accelerants or anthropogenic sources of ignition or explosion. Thus, when the spectral difference 50 or concentration of a molecular constituent from anthropogenic sources exceeds the threshold value 51, it may be possible to determine potential fraud or abnormal conditions associated with the target property 16. Additionally, the threshold value 51 may be a baseline value particular to the target property 16 or a generally known baseline value for the molecular constituent.

In some instances, an insurance company may wish to utilize the first surface albedo measurement 60 as a baseline reference value to determine if an abnormal condition exists on the target property 16 at a later time or to determine if an abnormal condition on the target property 16 at a later time may be the result of potential fraud. Thus, the first surface albedo measurement 60 may be stored on the historical database 45 for future reference. Accordingly, an insurance company may assess the condition of the target property 16 at some later time by taking a second surface albedo measurement 61 at a time after the first surface albedo measurement 60 is taken, by using the aforementioned remote sensing method. The insurance company may define a threshold value 52 above which an abnormal condition is deemed to exist on the target property 16 or above which potential fraud is suspected. The threshold value 52 may be an absolute number, such as a level of surface albedo. Alternatively, for example, the threshold value 52 may be a relative value, such as a percentage increase in surface albedo over a baseline value (e.g. first surface albedo measurement 60). Surface albedo, as used herein, refers to the ability of a surface to reflect light (i.e. the ratio of reflected radiation from the surface to incident radiation upon it).

For example, an abnormally high surface albedo measurement 60 may be indicative of a compression crater created by an explosion. The surface of a compression crater in the ground created by an explosion has a different surface density and water content than a normal ground surface, which results in a surface albedo that is higher than normal. The particular threshold value 52 varies based upon surface conditions at the target site as well as the requirements of the insurance company. However, the threshold values 52 may be determined and stored in the data storage device 30, as shown in FIG. 2. Table 2 below shows typical surface albedo values for various types of terrains and conditions. Accordingly, the threshold value 52 may be adjusted depending on the terrain or condition found at the target site.

TABLE 2

| SURFACE | ALBEDO (%) |
| --- | --- |
| Fresh snow or ice | 60-90 |
| Old, melting snow | 40-70 |
| Clouds | 40-90 |
| Desert sand | 30-50 |
| Soil | 5-30 |
| Tundra | 15-35 |
| Grasslands | 18-25 |
| Forest | 5-20 |
| Water | 5-10 |

Still referring to FIGS. 7a-7b, the method 100 may also include a step 130 of acquiring the first surface albedo measurement 60 from the remote sensor 12 operating in at least the infrared, visible and ultraviolet bands of the electromagnetic spectrum. At a step 132, the first surface albedo measurement 60 may be stored in the historical database 45 as a baseline reference value for future reference. In a step 133, a second surface albedo measurement 61 may be acquired in the same manner as the first surface albedo measurement 60, as shown in FIG. 1. The computer server 35 determines a surface albedo difference 62 at a step 134 by accessing the first surface albedo measurement 60 stored in the historical database 45 and comparing it to the second surface albedo measurement 61 generated at the step 133. The surface albedo difference 62 represents a change in the condition of the target property 16, which may have been potentially caused with intent to defraud the insurance company. In a step 136, the computer server 35 compares the surface albedo difference 62 to the threshold value 52. If the surface albedo difference 62 exceeds the threshold value 52, the computer server 35 initiates an insurance-related action at a step 126. In one example, the insurance-related action may be initiating a claim. In another example, the insurance related action may be transmitting a message indicating potential fraud or initiating a fraud investigation, because the surface albedo difference 62 indicates a surface condition associated with fraudulent activity.

In an alternative embodiment, a step 137 may be performed instead of steps 134 and 136. In a step 137, the computer server 35 determines whether the second surface albedo measurement 61 exceeds the threshold value 52. If the second surface albedo measurement 61 exceeds the threshold value 52, the computer server 35 initiates an insurance-related action at a step 126. In one example, the insurance-related action may be initiating a claim. In another example, the insurance related action may be transmitting a message indicating potential fraud or initiating a fraud investigation.

Figure 6:
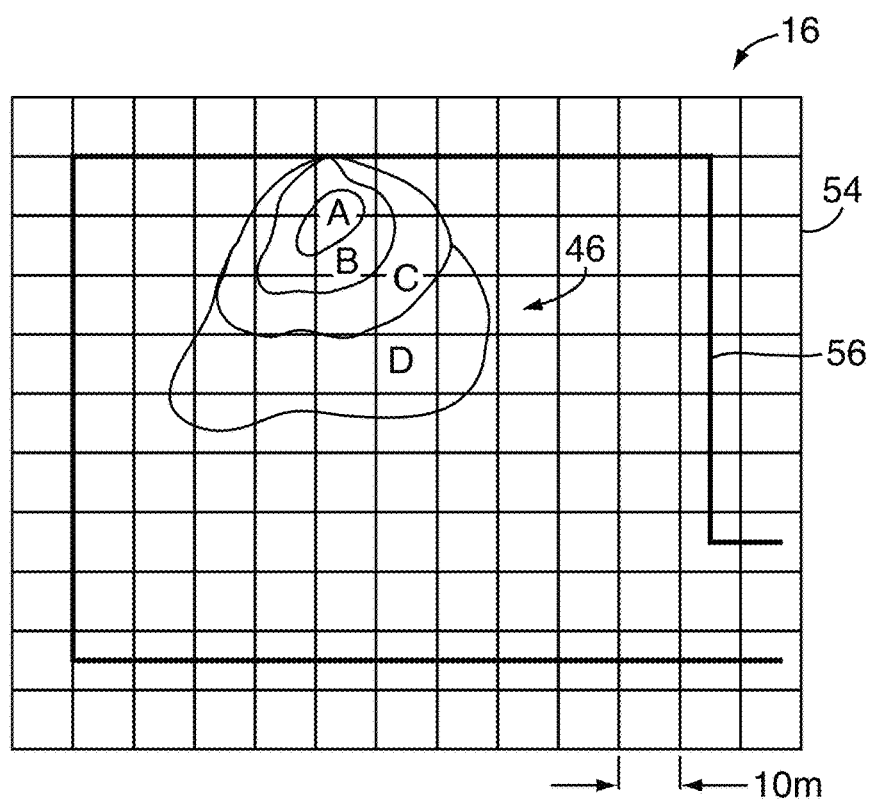
FIG. 6 is another depiction of the spectral signature generated by the post-processing system shown in FIG. 2.

In some examples, the spatial resolution of the sensor 12 may be sufficiently fine to ascertain the degree of damage at the target property 16. Referring to FIG. 6, a plot 54 includes a planform 56 of the target property 16 (e.g. a house) overlaid thereon. The second spectral signature 46 is shown wherein the carbon level is plotted as a function of the square area of the target property 16. Areas A through D are indicative of decreasing levels of carbon, with level A being the highest. A sensor 12 with a spatial resolution of approximately 1-meter side length would allow a determination of whether the entire target property 16 was burning (or had burned), or if only a partial loss of the target property 16 had been sustained. The example shown in FIG. 6 is representative of a partial loss. The determination of the damage affects the amount of the insurance insurance-related action, namely claim settlement.

Figure 8A:
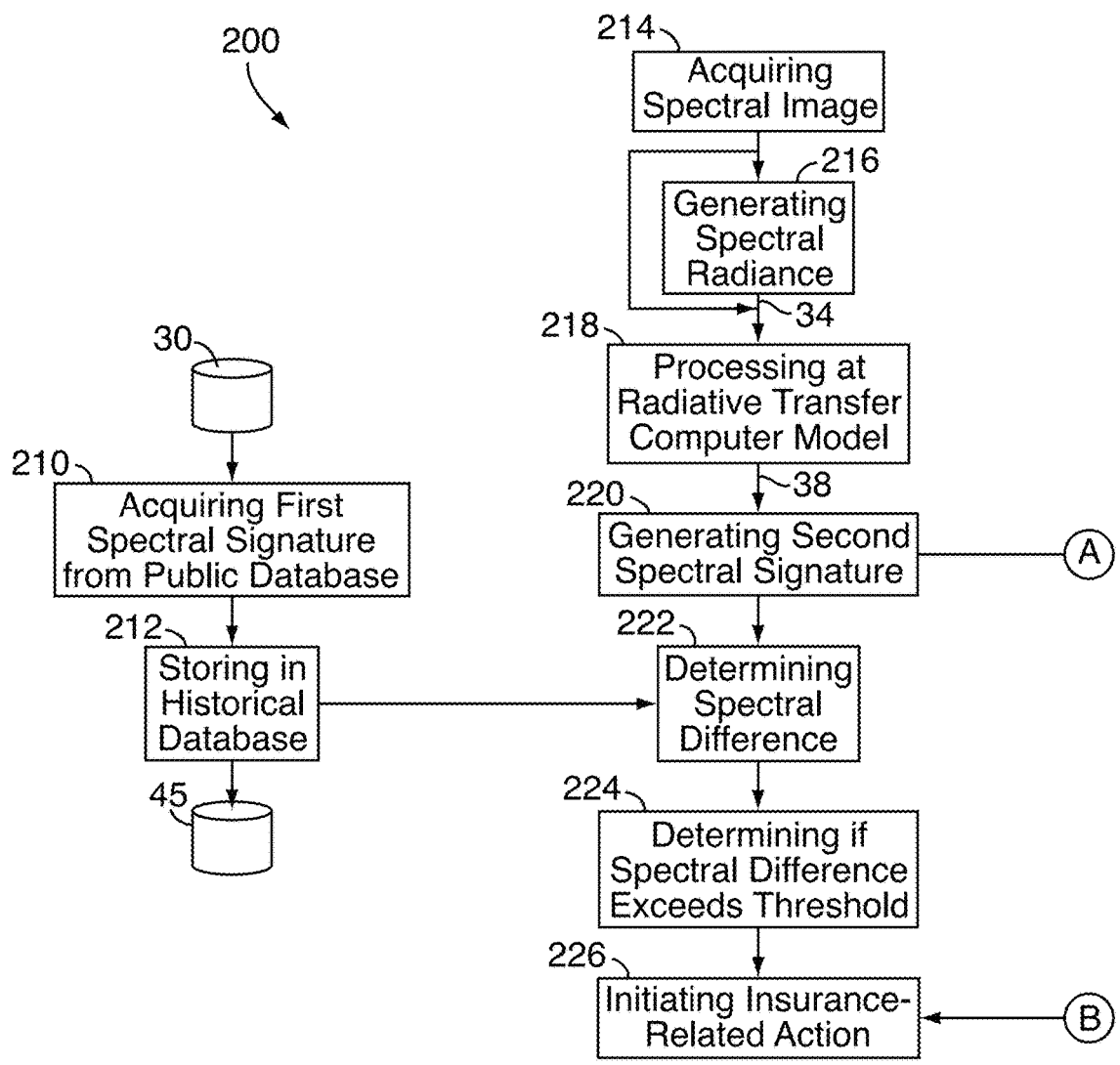
FIGS. 8a-8b show a block diagram of a method for assessing a condition of property in accordance with an alternate embodiment of the present invention.
Figure 8B:
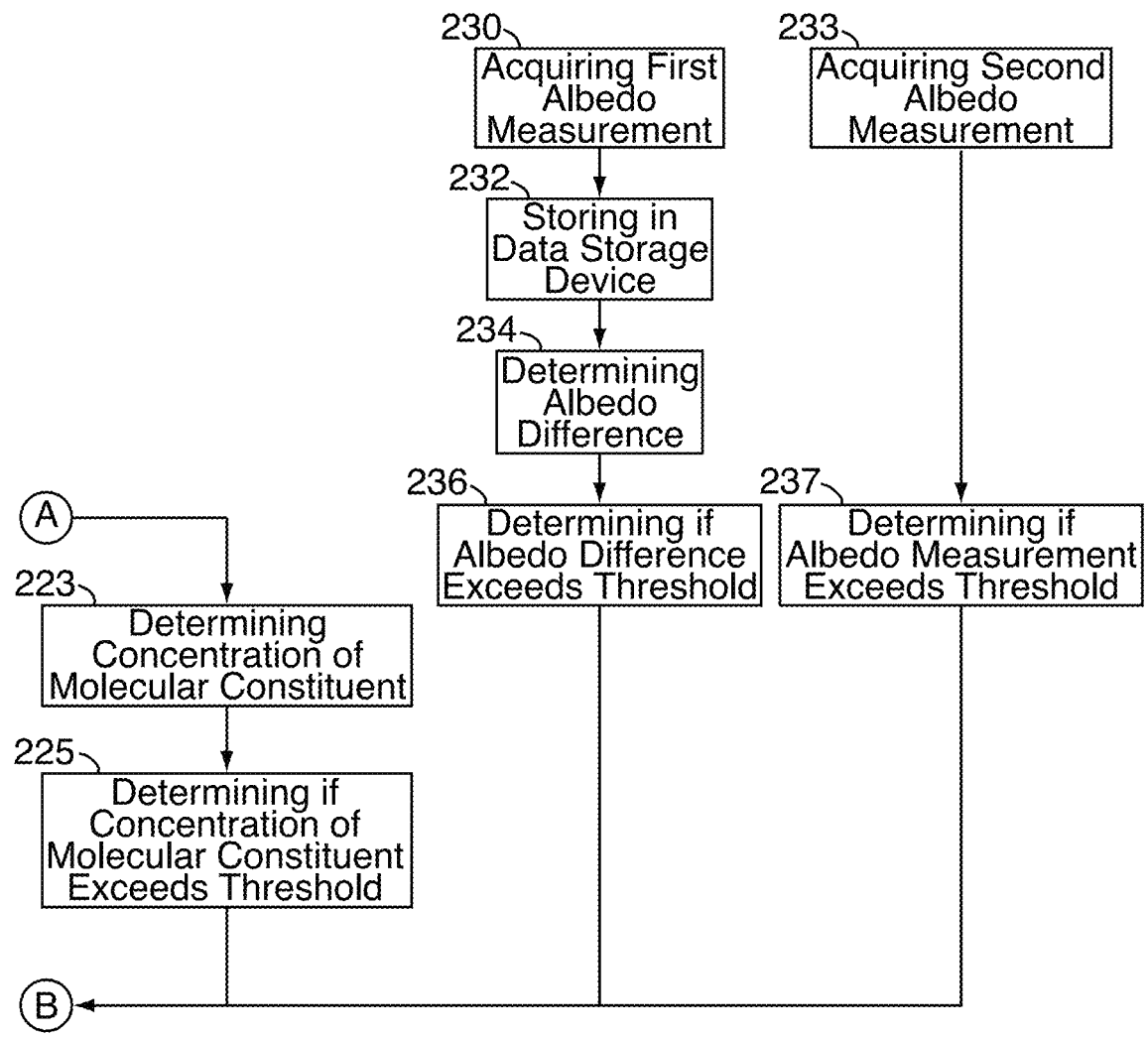

Referring to FIGS. 8a-8b, wherein like numerals indicate like elements, a method 200 for assessing a condition of property for insurance purposes comprises a step 210 wherein the first spectral signature 42 at the first timestamp 32 is acquired from the public database 31. The first spectral image 14 and the first spectral radiance plot 28 may also be acquired from the public database 31 if needed. The first spectral signature 42, and optionally the first spectral image 14 and first spectral radiance plot 28, are stored on the historical database 45 for future use at a step 212. At the second, later timestamp 48, the method 200 further comprises a step 214 wherein the second spectral image 43 is acquired from the remote sensor 12 operating in the electromagnetic spectrum. The second spectral image 43 may be converted to the second spectral radiance plot 44 at a step 216. The second spectral image 43 and/or the second spectral radiance plot 44 are used as the input 34 for the radiative transfer computer model 36 which, in a step 218, processes the input 34 to generate the second spectral signature 46 as the output 38 in a step 220. The first spectral signature 42 and the second spectral signature 46 comprise at least one molecular constituent concentration. In one example, the molecular constituent concentration is the percentage of water vapor in the lower atmosphere.

The spectral difference 50 is determined at a step 222 by accessing the first spectral signature 42 stored in the public database 31 and comparing it to the second spectral signature 46 generated at the step 220. The spectral difference 50 represents a change to the condition of the target property 16. In some cases, the change may exceed the threshold value 51 for the particular spectral signature being compared. For example, in a step 224 the spectral difference 50 is compared to the threshold value 51. If the spectral difference 50 exceeds the threshold value 51, the computer server 35 initiates an insurance-related action at a step 226.

In one example, the insurance-related action is initiating a claim because the spectral difference indicates the target property 16 has been lost to a flood. In another example, the insurance related action may be transmitting a message indicating potential fraud or initiating a fraud investigation, because the spectral difference indicates a high level of a molecular constituent associated with fraudulent activity. For example, the spectral difference may indicate a high level of a molecular constituent that is a byproduct or residual product of anthropogenic fire accelerants or anthropogenic sources of ignition or explosion. Accordingly, server 35 may send a message indicating an abnormal condition at a target property 16 to a work queue in a remote computer 71 for an investigator to perform a fraud investigation or for an agent to perform a field inspection. Also, server 35 may send a message to the insurance company's payment computer system 72 for a stop payment or recovery of payment based on a determination of fraud or potential fraud.

In an alternative embodiment, steps 223 and 225 may be performed instead of steps 222 and 224. In a step 223, a concentration of a molecular constituent is determined from the second spectral signature 46. The concentration of the molecular constituent may be associated with a condition of the target property 16, which may have been potentially caused with intent to defraud the insurance company. If the concentration of the molecular constituent from the spectral signature 46 exceeds the threshold value 51, the computer server 35 an insurance-related action at a step 226.

In one example, the insurance-related action may be initiating a claim because the concentration of the molecular constituent indicates a change in condition to the target property 16 (e.g., fire damage, flooding). In another example, the insurance related action may be transmitting a message indicating potential fraud or initiating a fraud investigation, because the concentration of the molecular constituent indicates abnormal levels associated with fraudulent activity. More particularly, server 35 may send a message indicating an abnormal condition at a target property 16 to a work queue in a remote computer 71 for an investigator to perform a fraud investigation or for an agent to perform a field inspection. Also, server 35 may send a message to the insurance company's payment computer system 72 for a stop payment or recovery of payment based on a determination of fraud or potential fraud.

The threshold value 51 may be a baseline value based on the concentration of a molecular constituent under various normal conditions. The threshold value may be set such that a spectral difference 50 or concentration of a molecular constituent exceeding the threshold value provides a strong indication of an abnormal condition at the target property 16. For example, the threshold value for a molecular constituent may be set some percentage above normal concentrations of the molecular constituent. The threshold value 51 may be established with respect to a molecular constituent that is a byproduct or residual product of burning, flooding, anthropogenic fire accelerants or anthropogenic sources of ignition or explosion. Thus, when the spectral difference 50 or concentration of a molecular constituent from anthropogenic sources exceeds the threshold value 51, it may be possible to determine potential fraud or abnormal conditions associated with the target property 16. Additionally, the threshold value 51 may be a baseline value particular to the target property 16 or a generally known baseline value for the molecular constituent.

Still referring to FIGS. 8a-8b, the method 200 may also include a step 230 of acquiring the first surface albedo measurement 60 from the remote sensor 12 operating in at least the infrared, visible and ultraviolet bands of the electromagnetic spectrum. At a step 232, the first surface albedo measurement 60 may be stored in the historical database 45 as a baseline reference value for future reference. In a step 233, a second surface albedo measurement 61 may be acquired in the same manner as the first surface albedo measurement 60, as shown in FIG. 1. At a step 234, the computer server 35 determines a surface albedo difference 62 by accessing the first surface albedo measurement 60 stored in the historical database 45 and comparing it to the second surface albedo measurement 61. The surface albedo difference 62 represents a change in the condition of the target property 16, which may have been potentially caused with intent to defraud the insurance company. In a step 236, the computer server 35 compares the surface albedo difference 62 to the threshold value 52. If the surface albedo difference 62 exceeds the threshold value 52, the computer server 35 initiates an insurance-related action at a step 226. In one example, the insurance-related action may be initiating a claim. In another example, the insurance related action may be transmitting a message indicating potential fraud or initiating a fraud investigation, because the surface albedo difference 62 indicates a surface condition associated with fraudulent activity.

In an alternative embodiment, a step 237 may be performed instead of steps 234 and 236. In a step 237, the computer server 35 determines whether the second surface albedo measurement 61 exceeds the threshold value 52. If the second surface albedo measurement 61 exceeds the threshold value 52, the computer server 35 initiates an insurance-related action at a step 226. In one example, the insurance-related action may be initiating a claim. In another example, the insurance related action may be transmitting a message indicating potential fraud or initiating a fraud investigation.

In operation, the sensor 12 preferably measures upwelling radiation, that is, the component of radiation (either reflected solar or emitted terrestrial) that is directed upward from the earth's surface. The upwelling sensor 12, typically located high in the atmosphere, measures radiation emitted from ground objects below, such as the target property 16. Spectral signatures 42, 46 such as concentration of carbon at ground level are useful in determining changes in the condition of properties of structures. The upwelling sensor 12 may also measure radiation emitted from an atmospheric mixing layer 58 in the vicinity of the target property 16, as shown in FIG. 1. Typically, the mixing layer 58 extends from ground level to approximately 10,000 thousand feet altitude. Measurements in the mixing layer 58 of the atmosphere are useful to ascertain differences from the normal molecular constituents.

The spectral images 14, 43 obtained by the sensor 12 may be across a broad spectrum of radiation frequencies, but other spectral signatures 42, 46 are possible without departing from the scope of the present invention. For example, in another example of the present invention, the visible light spectrum (700 nm to 400 nm) may be utilized to obtain the first spectral signature 42 on the target property 16. The sensor 12, comprising high-resolution photographic or video imaging equipment, is employed to establish the first spectral signature 42 at the first timestamp 32, and the second spectral signature 46 at the second, later timestamp 48. Comparison of the two spectral signatures yields the spectral difference 50, which is compared to the threshold value 51. In the disclosed example, the threshold value 51 corresponds to a visual threshold in the condition of the target property 16.

Figure 9:
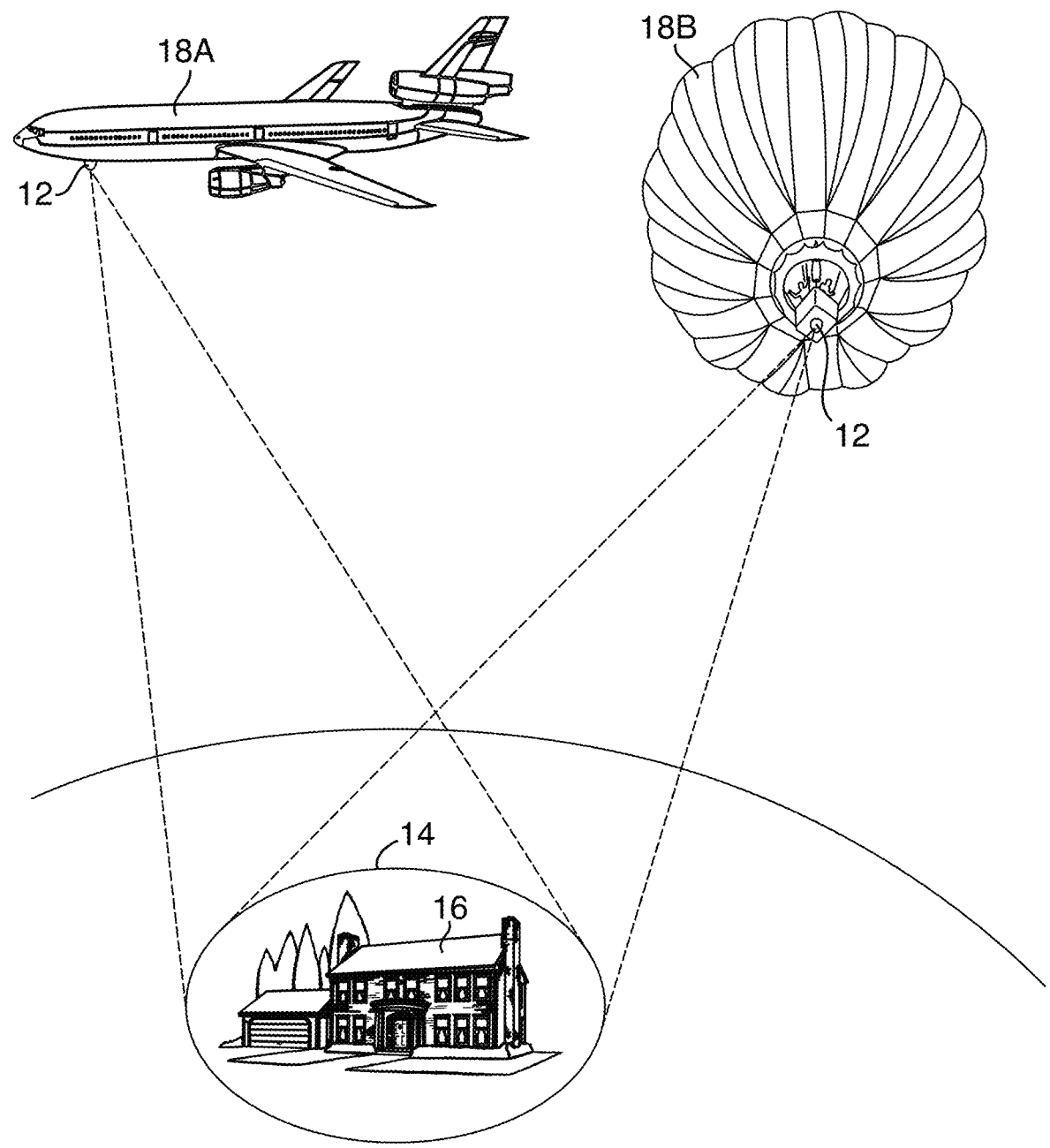
FIG. 9 is a schematic diagram of a system for collecting the spectral image of FIG. 1 in accordance with an alternate embodiment of the present invention.
Figure 10:
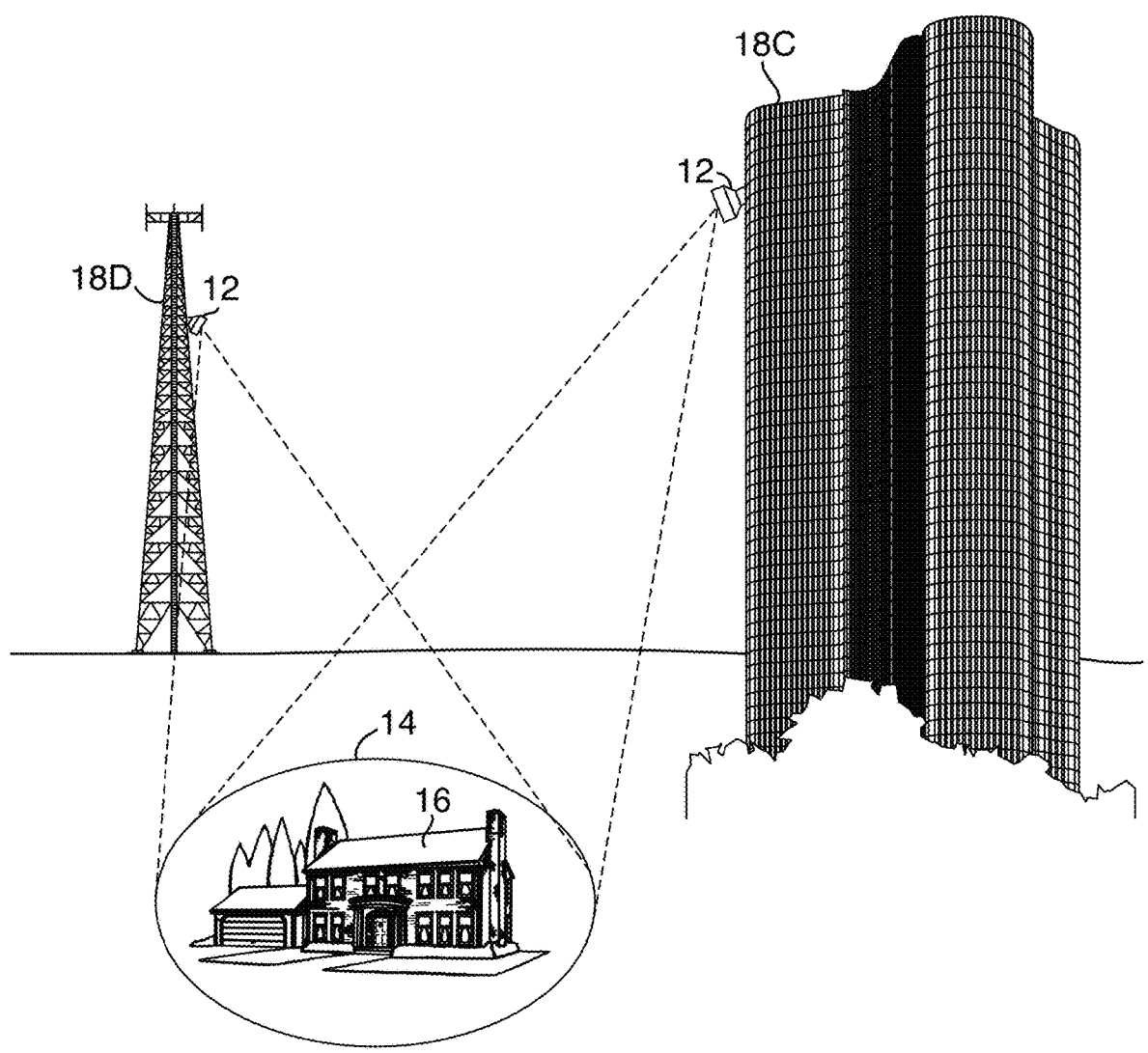
FIG. 10 is a schematic diagram of a system for collecting the spectral image of FIG. 1 in accordance with a further embodiment of the present invention.
Figure 11:
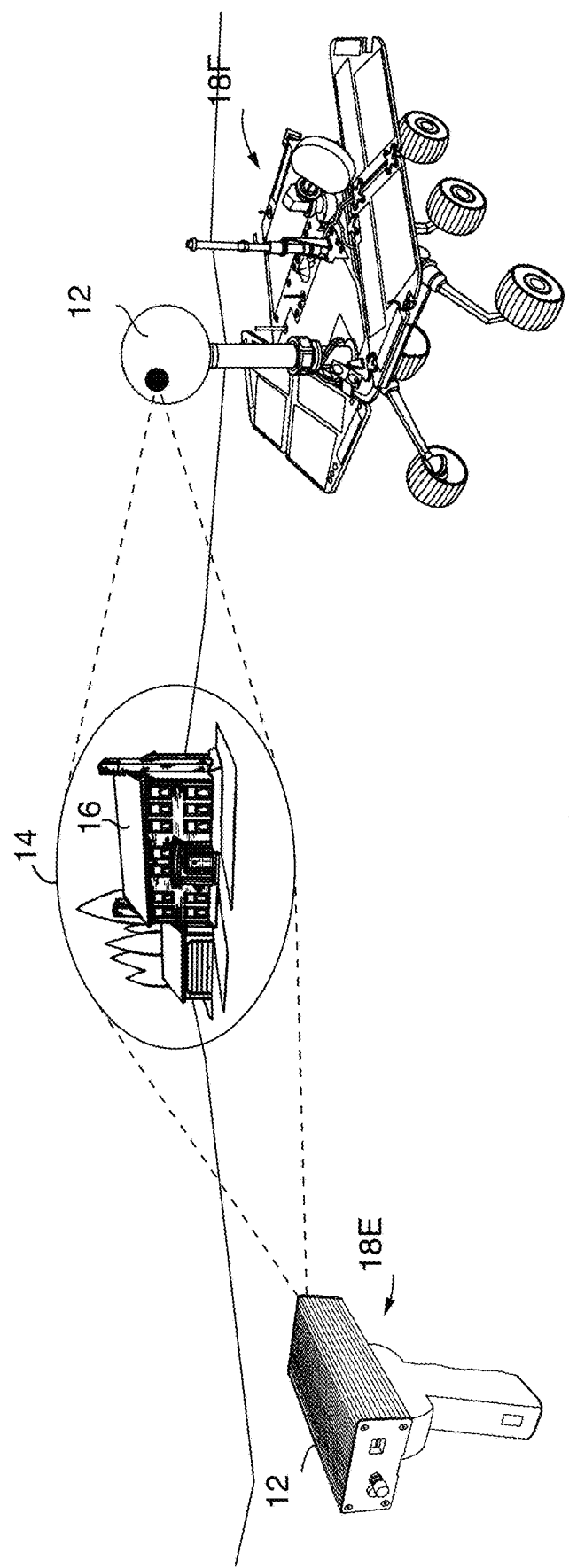
FIG. 11 is a schematic diagram of a system for collecting the spectral image of FIG. 1 in accordance with a further embodiment of the present invention.

The sensor 12 may be housed in the carrier vehicle 18 such as a satellite far above the target property 16 or, alternatively, the sensor 12 may be housed in a carrier vehicle closer to the ground. Referring to FIG. 9, the sensor 12 is shown in a carrier vehicle 18A such as an airplane or remotely piloted vehicle. The sensor 12 may also be housed in a carrier vehicle 18B such as a weather balloon. Referring to FIG. 10, the sensor 12 may be housed in a tall building 18C, or a communications tower 18D. In the illustrated examples, the sensor 12 is located remotely from the target property 16. However, as illustrated in FIG. 11, the sensor 12 may be a ground sensor. For example, as shown in FIG. 11, the sensor 12 may be housed in a handheld device 18E so that a person (e.g., insurance agent, insured, etc.) may acquire spectral images and/or surface albedo measurements from the ground. Alternatively, as also shown in FIG. 11, the sensor 12 may be housed in a robot 18F that may be operated remotely so that spectral images and/or surface albedo measurements may be acquired from the ground.

Other insurance-related actions, such as underwriting, are possible without departing from the scope of the invention. In another feature of the present invention, the sensor 12 is positioned to capture the first spectral image 14 of the target property 16. Typically, the target property 16 is an insured interest, such as real property, dwellings, and personal property, such as motor vehicles. However, the target property 16 may also comprise an uninsured interest which the insurance company is considering underwriting. In one example, the insurance company scans the target property 16 to ascertain any conditions that may be out of the ordinary, such as anthropogenic substances. The second spectral signature 46 is established by the system 10 and/or methods 100, 200 disclosed herein, and compared to the first spectral signature 42 obtained from the public database 31. The spectral difference 50 may reveal high levels of methane ($CH_4$), indicative of a possible drug laboratory. In response to the changes in the condition of the target property 16, the insurance company may elect not to underwrite a policy.

In another embodiment of the present invention, the insurance-related action is sharing the condition of the target property 16 with a third party, such as the insured, a different insurance company, or a government agency. By disclosing the condition to a third party, the insurance company may prevent further monetary loss or damage. For example, if the condition of the target property 16 indicates flooding, the insurance company may notify the property or local emergency personnel. Disclosure of the condition with government agencies, such as the Federal Emergency Management Agency for example, could aid in coordinating allocation of equipment or supplies when FEMA personnel are unable to access the target property 16 directly.

In another feature of the present invention, the effects of infrared radiation on water vapor are utilized to determine flooding. As previously stated, the constituent profile of the Earth's lower atmosphere is well known, including water vapor content, and publicly-available databases serve as the first spectral signature 42. The insurance company obtains the second spectral signature 46 of the target property 16 at the second timestamp 48, and compares it to the first spectral signature 42. If the target property 16 is flooded, abnormally high levels of water vapor will be detected by the spectral difference 50. Accordingly, the computer server 35 the insurance-related action, namely a claim, to cover the loss.

One advantage of the present system is that the condition of the target property 16 can be ascertained without sending personnel directly to the location. This is particularly advantageous in the event of a catastrophic loss, such as that encountered after a hurricane or flood. Insurance personnel may not have direct access to the target property 16 to assess its condition. In addition, local power interruptions and blackouts may prevent insurance personnel from transmitting any data to a home office for processing. Thus, the insurance-related action, such as a claim, may be delayed weeks, or even months, until such time as the target property 16 can be accurately assessed. The present invention allows insurance claims to be processed much quicker with less risk to the insurance company and its personnel. Insurance personnel are not exposed to dangerous environments, and the insurance company can accurately assess the condition of the target property 16.

Another advantage of the present system is that the sensor 12 is not subjected to the conditions of the local environment. In the event of a catastrophic loss, in-situ sensors may be damaged or lost, and therefore unable to transmit data. Sensor 12 located remotely from the target property 16 will still function.

Another advantage of the present invention is that the insurance-related action such as a claim may be initiated sooner than by the prior art process of sending personnel. In some instances, such as when the target property 16 is in a remote location, an insurance claim could be processed before the property owner realized there was damage.

Another advantage of the present invention is that changes to the physical condition of the target property 16 may be ascertained even though the changes are not visible to the naked eye, or able to be recorded by photographic means. For example, the target property 16 may have a high level of non-naturally occurring substances such as chlorofluorocarbons (CFCs). The system 10 and methods 100, 200 disclosed herein allow the insurance company to conduct the insurance-related action, for example a risk assessment, to determine if the target property 16 would suit the portfolio of the insurance company. The risk assessment is conducted with no human exposure to the CFCs present on the target property 16. Thus, the present invention is useful for risk avoidance or risk minimization.

Although this invention has been shown and described with respect to the detailed embodiments thereof, it will be understood by those skilled in the art that various changes in form and detail thereof may be made without departing from the spirit and scope of the invention. For example, the sensor 12 may acquire the spectral images 14, 43 in the microwave spectrum (10 to 0.01 cm) or the ultraviolet spectrum ($4 \times 10^{-5}$ to $10^{-7}$ cm). The spectral images 14, 43 gathered in this manner are processed in a similar manner as infrared imagery.

What is claimed is:

1. A method for assessing a condition of an insured property for insurance purposes, the method comprising the steps of:

determining, by a computer processor, a first spectral signature indicative of a first concentration of a molecular constituent at the insured property at a first timestamp;

determining, by the computer processor, a second spectral signature indicative of a second concentration of the molecular constituent at the insured property at a second timestamp later than the first timestamp;

determining, by the computer processor, a spectral difference between the first spectral signature and the second spectral signature, the spectral difference corresponding to a difference between the first and second concentrations of the molecular constituent; and determining, by the computer processor, whether the spectral difference exceeds a first predetermined threshold value, which is indicative of a change in the condition of the insured property.

2. The method according to claim 1, wherein the first spectral signature is determined from a first spectral image of radiation emitted at the insured property at the first timestamp;

wherein the second spectral signature is determined from a second spectral image of radiation emitted at the insured property at the second timestamp.

3. The method according to claim 2, wherein the first spectral image and the second spectral image are generated by a remote sensor operating in the infrared, visible and ultraviolet bands of the electromagnetic spectrum.

4. The method according to claim 1, further comprising:
analyzing, by the computer processor, a surface albedo measurement of the insured property;
determining, by the computer processor, whether the surface albedo measurement exceeds a second predetermined threshold value.

5. The method according to claim 4, further comprising:
transmitting, by the computer processor, a message indicating potential insurance fraud if the spectral difference exceeds the first predetermined threshold value and/or the surface albedo measurement exceeds the second predetermined threshold value.

6. The method according to claim 1, wherein the molecular constituent is a byproduct or residual product of anthropogenic fire accelerants or anthropogenic sources of ignition or explosion.

7. The method according to claim 1, wherein the molecular constituent is selected from the group consisting of alcohols, phenols, nitro compounds, NOH oxime, N—O amine oxide, N=O, and $N_2$-based compounds.

8. The method according to claim 2, wherein the computer processor executes a radiative transfer computer model, the model processing an input comprising the second spectral image and generating an output comprising the second spectral signature, wherein the processing includes a plurality of forward models and at least one inverse model.

9. The method according to claim 8, wherein the input of the radiative transfer computer model further comprises the first spectral image and the output of the radiative transfer computer model further comprises the first spectral signature.

10. The method according to claim 9, further comprising a step of converting the first spectral image to a first spectral radiance plot, the input to the radiative transfer computer model comprising the first spectral radiance plot.

11. The method according to claim 8, further comprising a step of converting the second spectral image to a second spectral radiance plot, the input to the radiative transfer computer model comprising the second spectral radiance plot.

12. A method for assessing a condition of a property for insurance purposes, the method comprising the steps of:
determining, by a computer processor, a spectral signature indicative of a concentration of a molecular constituent at the insured property; and
determining, by the computer processor, whether the concentration of the molecular constituent exceeds a first predetermined threshold value, which is indicative of a condition of the insured property.

13. The method according to claim 12, wherein the spectral signature is determined from a spectral image of radiation emitted at the insured property.

14. The method according to claim 13, wherein the spectral image is generated by a remote sensor operating in the infrared, visible and ultraviolet bands of the electromagnetic spectrum.

15. The method according to claim 12, further comprising:
analyzing, by the computer processor, a surface albedo measurement of the insured property;
determining, by the computer processor, whether the surface albedo measurement exceeds a second predetermined threshold value.

16. The method according to claim 15, further comprising:
transmitting, by the computer processor, a message indicating potential insurance fraud if the concentration of the molecular constituent exceeds the first predetermined threshold value and/or the surface albedo measurement exceeds the second predetermined threshold value.

17. The method according to claim 12, wherein the molecular constituent is a byproduct or residual product of anthropogenic fire accelerants or anthropogenic sources of ignition or explosion.

18. The method according to claim 12, wherein the molecular constituent is selected from the group consisting of alcohols, phenols, nitro compounds, NOH oxime, N—O amine oxide, N=O, and $N_2$-based compounds.

19. The method according to claim 13, wherein the computer processor executes a radiative transfer computer model, the radiative transfer computer model processing an input comprising the spectral image and generating an output comprising the spectral signature indicative of the concentration of the molecular constituent, wherein the radiative transfer computer model includes a plurality of forward models and at least one inverse model.

20. The method according to claim 19, further comprising a step of converting the spectral image to a spectral radiance plot, the input to the radiative transfer computer model comprising the spectral radiance plot.

* * * * *